Figure 1:
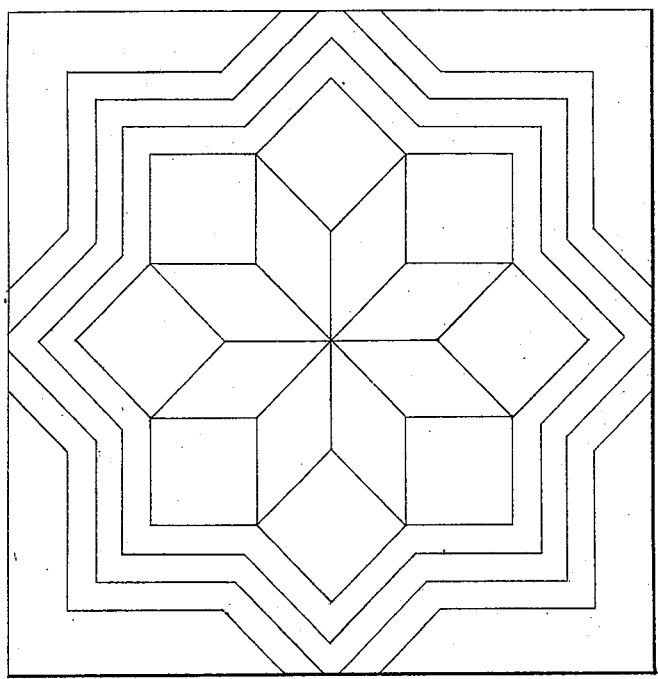
Figure 2:

G. G. Garibaldi,
Paving Tiles,
№ 76,742. Patented Apr. 14, 1868.

Witnesses:

Inventor:

United States Patent Office.

G. GIUSEPPE GARIBALDI, OF BUFFALO, NEW YORK.

Letters Patent No. 76,742, dated April 14, 1868.

IMPROVED MOSAIC FLOOR.

*The Schedule referred to in these Letters Patent and making part of the same.*

TO ALL WHOM IT MAY CONCERN:

Be it known that I, G. GIUSEPPE GARIBALDI, of the city of Buffalo, county of Erie, and State of New York, have invented a new and improved Composition Mosaic Floor; and I do hereby declare that the following is a full, clear, and exact description thereof, reference being had to the accompanying drawings, making a part of this specification, in which—

Figure I is a plan view of one block, made according to the principle of my improvement.

Figure II represents a section of such block.

I am aware that a composition, consisting of pieces of glass, marble, precious stones, &c., of various colors, cut square, and cemented on a ground of stucco, in a manner to imitate the gradations of painting called "mosaic work," has heretofore been known and used.

I am also aware that a composition in imitation of marble, consisting of plaster or stucco, made of gypsum, with variegated colors, called "scagliola," has heretofore been known and used.

I am also aware that a coarse plaster or mortar, which becomes hard and durable in water, called "trass," has been known and used before my invention.

My invention differs from each of these, and consists of the product of new combination of parts, and the process of producing such product.

In the first part of my process I take fresh lime, rough sand, and scagliola, in about equal parts, and mix them thoroughly together, which forms a plastic mortar. Any form of block or tile (or a whole floor in one block,) is then made of this mortar and thoroughly dried. This forms a foundation or base, as shown at A in the drawing.

I then use a marble cement, which is fully described in a patent granted to me on the 20th day of August, A. D. 1867, and mix therewith small stones, pebbles, or pieces of rock, of different forms and colors, making separate and distinct parcels for each figure or design and color to be wrought into the floor.

These parcels, so compounded, are spread upon the foundation in a manner to produce such design, figure, and color as may be required, and form an upper layer or surface, as represented at B in the drawing. This surface-coat soon unites with the foundation, forming a solid marble or stone-like combination. The surface is rendered smooth and polished by friction or rubbing in any well-known manner.

Blocks or tiles of any size or form may be made in this manner, and then laid into a floor or ceiling, or used for other purposes, or a whole floor may be made of one entire block. The work soon becomes hard and marble-like, and is rich and beautiful in appearance, and is cheap and durable.

What I claim as my invention, and desire to secure by Letters Patent, is—

1. A composition for mosaic work, substantially as herein described.
2. A mosaic floor, ceiling, or wall, made of the composition, and in the manner substantially as herein described.

G. GIUSEPPE GARIBALDI.

Witnesses:
E. B. FORBUSH,
EDW. WILHELM.